United States Patent
Hool et al.

(10) Patent No.: US 7,104,613 B2
(45) Date of Patent: Sep. 12, 2006

(54) PUMP WITH RECIPROCATING HIGH PRESSURE SEAL AND VALVE FOR VEHICLE BRAKING SYSTEMS

(75) Inventors: Patrick H. Hool, Saint Clair, MI (US); Westley J. Wilke, Lincoln Park, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/901,494

(22) Filed: Jul. 28, 2004

(65) Prior Publication Data

US 2006/0022516 A1 Feb. 2, 2006

(51) Int. Cl.
B60T 8/42 (2006.01)
(52) U.S. Cl. ..................................... 303/115.4; 303/10
(58) Field of Classification Search .................. 303/10, 303/115.4, 116.1
See application file for complete search history.

(56) References Cited

U.S. PATENT DOCUMENTS

| | | | | |
|---|---|---|---|---|
| 3,224,378 A | * | 12/1965 | Graham | ..................... 417/511 |
| 4,114,059 A | | 9/1978 | Albaric et al. | |
| 4,556,261 A | * | 12/1985 | Farr | ......................... 303/115.6 |
| 4,893,473 A | * | 1/1990 | Hool et al. | ................... 60/589 |
| 4,975,028 A | * | 12/1990 | Schultz | ....................... 417/442 |
| 5,207,567 A | * | 5/1993 | Joy | ............................ 417/540 |
| 5,336,066 A | * | 8/1994 | Myers et al. | ............. 417/555.1 |
| 6,671,966 B1 | * | 1/2004 | Lewis | ........................ 30/228 |
| 2005/0074349 A1 | | 4/2005 | Hool et al. | |

FOREIGN PATENT DOCUMENTS

| | | |
|---|---|---|
| CH | 308 083 A | 6/1955 |
| GB | 742113 A | 12/1955 |
| JP | 60198382 A | 10/1985 |
| WO | PCT/US2004/032607 | 10/2004 |
| WO | WO 2005/032897 A1 | 4/2005 |

OTHER PUBLICATIONS

U.S. Appl. No. 10/678,676, filed Oct. 3, 2003, Hool et al.

* cited by examiner

*Primary Examiner*—Devon Kramer
(74) *Attorney, Agent, or Firm*—MacMillan, Sobanski & Todd, LLC

(57) ABSTRACT

A pump assembly with a combination reciprocating high-pressure seal and fluid inlet check valve for use within brake systems. The pump assembly comprises a housing having a bore formed therethrough and a piston disposed within the bore for reciprocal movement therein. An annular seal is disposed around the piston for reciprocal movement thereon. The annular seal cooperates with the piston and/or the housing to form at least one longitudinally extending passageway. The passageway, the piston, the annular seal, and the housing cooperating to form a check valve assembly. The annular seal is moveable to a first position relative to the piston in which the check valve assembly is in a flow-through position to fill a pump chamber with fluid from an inlet chamber during a fluid inlet stroke. The annular seal is moveable to a second position relative to the piston in which the check valve assembly is closed.

16 Claims, 7 Drawing Sheets

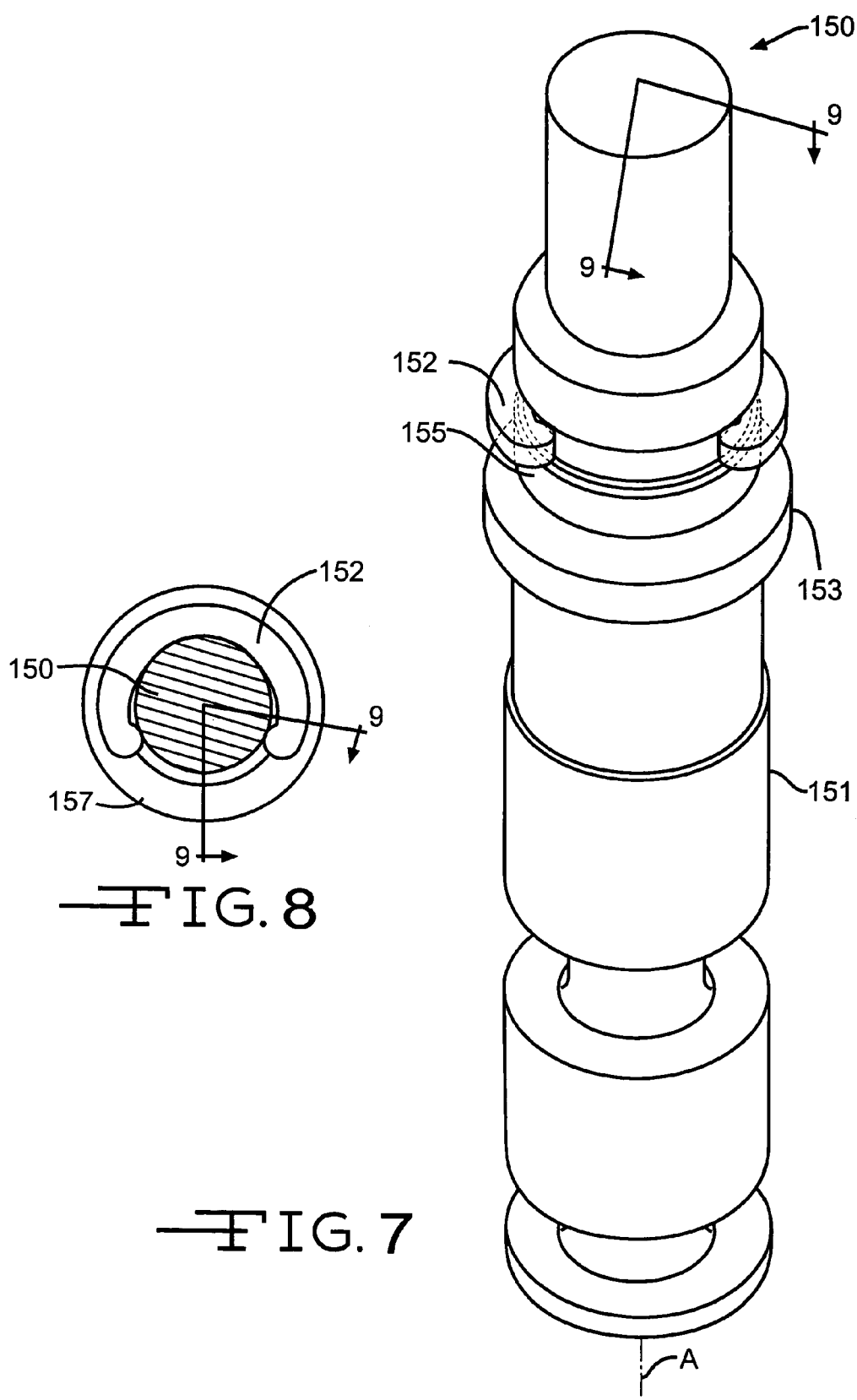

PUMP WITH RECIPROCATING HIGH PRESSURE SEAL AND VALVE FOR VEHICLE BRAKING SYSTEMS

BACKGROUND OF THE INVENTION

This invention relates in general to brake systems for vehicles and in particular to a pump assembly with a combination reciprocating high-pressure seal and fluid inlet check valve for use within brake systems.

In conventional vehicular brake systems having anti-lock brake, traction control and/or vehicle stability control, a supply of hydraulic fluid for the vehicle brakes is modulated by a hydraulic control unit. Various hydraulic pumps may be employed to selectively supply hydraulic fluid to the vehicle brakes. Several hydraulic pump designs are known.

U.S. Pat. No. 4,556,261 to Farr, discloses a prior art pump and skid sensing assembly for a vehicle hydraulic anti-skid braking system, as shown in FIGS. 1 and 2. The assembly comprises a housing 1 incorporating a hydraulic pump 2, and a solenoid-operated valve assembly 3. Only the operation of the pump 2 will be described herein, as the operation of the rest of the anti-skid braking system is not relevant to the present invention. The pump 2 includes a plunger 10, which reciprocates within a stepped bore 11 in the housing 1. The plunger 10 is engageable with a drive mechanism comprising a ring 12 rotatable on a shaft 4. The plunger 10 carries an 'O' ring seal 18 and a lip seal 19. The seals 18 and 19 are disposed on opposite sides of a passage 20 leading to the valve 3. The seals 18 and 19, the plunger 10, and the bore 11 define a chamber 22. A reservoir 35 supplies the chamber 22 with fluid.

The seal 19, which is illustrated in detail in FIG. 2, comprises an annular ring of elastomeric material, which is received in an annular groove 25 in the plunger 10. The groove 25 is parallel sided and is of an axial length greater than the thickness of the seal 19. Opposite faces 26 and 27 of the seal 19 are respectively planar and of reduced area, with the face 27 of reduced area being provided with at least one diametrical slot 28 which communicates with one or more passages 29 in the inner peripheral edge of the seal 19. The planar face 26 is adapted to seal against the adjacent, inner, face 25a of the groove 25 to prevent flow from the secondary chamber 22 into the reservoir 35 when the seal 19 is in a first position relative to the plunger 10. The face 25a is formed by an inlet flange 40 of the plunger 10. Thus, the face 26 of the seal 19 and the inlet flange 40 form a check valve assembly for separating the secondary chamber 22 and the reservoir 35. The seal 19 is rather complex in that it contains at least one radial slot 28 and at least one longitudinal passage 29 formed therethrough to permit fluid flow past the check valve assembly when the face 22 of the seal 19 abuts the adjacent side wall of the groove 25.

An inlet passageway 41 is formed by the inlet flange 40 and the housing 1. A retaining flange 42 and the housing 1 form an outlet passageway 43 of the check valve assembly. As the plunger 10 is moved towards the ring 12, the seal 19 moves to a second position relative to the plunger 10 so that the face 26 is spaced apart from the adjacent side wall of the groove 25 and the inlet flange 40. In the second position, the seal 19 may abut the retaining flange 41. This allows fluid from the reservoir 35 to be drawn into the increasing volume of the chamber 22 past the seal 19. When the seal 19 is in the second position, the longitudinal passageway 29 is not in direct communication with the outlet passageway 43. When the seal 19 is in the second position, the longitudinal passage 29 is in fluid communication with the inlet passageway 41, and the longitudinal passage 29 is in fluid communication with the radial slot 28. The radial slot 28 is in fluid communication with the outlet passageway 43, such that the check valve assembly is in an open position and the chamber 22 and the reservoir 35 are communicably connected. Therefore, the radial slot 28 allows the longitudinal passageway 29 to be in indirect fluid communication with the outlet passageway 43. The radial slot 28 has an outer radius that extends beyond the outer radius of the longitudinal passage 29 taken about a longitudinal axis of the plunger 10.

As the plunger 10 is moved in the opposite direction, the face 26 of the seal 19 seals against the adjacent face of the groove 25 so that fluid cannot flow between the plunger 10 and the seal 19 or through the slot 28 and the at least one passage 29 within the seal 19. The seal 19 in this condition thus provides a seal between the plunger 10 and the wall of the bore 11, closing the check valve assembly, and allowing the plunger 10 to pump fluid from the secondary chamber 22 into the primary chamber 23.

SUMMARY OF THE INVENTION

Although prior hydraulic pumps, such as the one described above, have been effective, it would be desirable to provide a low cost pump assembly having more easily manufactured and more durable components.

The present invention is a pump assembly with a combination reciprocating high-pressure seal and fluid inlet check valve for use within brake systems. The pump assembly comprises a piston for reciprocal movement within a bore in a housing.

The pump assembly includes a housing having a bore formed therethrough and a piston disposed within the bore for reciprocal movement along a longitudinal axis therein. The piston has an inlet flange extending outwardly substantially perpendicular to the longitudinal axis. An annular seal is disposed around the piston for reciprocal movement thereon. The annular seal cooperates with at least one of the piston and the housing to form a longitudinally extending passageway. The passageway, the piston, and the annular seal cooperating to form a check valve assembly. The check valve assembly divides the bore into an inlet chamber and a pumping chamber. The retaining flange and the housing cooperate to form an outlet passageway of the check valve assembly. The annular seal is moveable to a first position relative to the inlet flange in which the at least one longitudinally extending passageway communicates directly with the outlet passageway to the pumping chamber and said check valve assembly is in a flow-through position to fill the pumping chamber with fluid from the inlet chamber during a fluid inlet stroke. The annular seal is moveable to a second position relative to the inlet flange in which the check valve assembly is closed.

In a preferred embodiment, the piston includes a retaining flange and an intermediate portion disposed between the retaining flange and the inlet flange. Both the retaining flange and the inlet flange extend substantially perpendicular from the piston. The inlet flange and the housing cooperate to form at least one inlet passageway through the bore. The at least one longitudinally extending passageway and the at least one inlet passageway are communicably connected. The retaining flange and the housing cooperate to form at least one outlet passageway through the bore. The retaining flange may be comprised of a cir-clip disposed around the piston.

A high-pressure seal is disposed around the intermediate portion of the piston. The seal is not as thick as the intermediate portion is long, and, therefore, the seal can reciprocate between the retaining flange and inlet flange. The seal and the inlet flange cooperate to form a first check valve assembly, as will be described below.

The piston, housing, the first check valve assembly, and a second check valve assembly define a pumping chamber. The piston, housing, and the first check valve assembly define an inlet chamber. A fluid inlet supplies fluid to the inlet chamber.

On a fluid inlet stroke, the piston withdraws from the bore and the volume of the pumping chamber increases. As the piston withdraws, the seal is moved into a first position relative to the inlet flange, in which the seal is not seated against the inlet flange. With the seal in the first position, the first check valve assembly is opened, and fluid from the inlet chamber is allowed to flow into the pumping chamber.

On a pumping stroke, the piston moves toward the second check valve assembly, and the seal is moved into a second position relative to the inlet flange, in which the seal is seated against the inlet flange. When the seal is in the second position, the inlet flange and seal cooperate to prevent fluid from exiting the pumping chamber, such that the first check valve assembly is closed. The fluid pressure builds within the pumping chamber until the pressure overcomes the force required to unseat the ball of the second check valve assembly. The second check valve assembly then opens, allowing the pressurized fluid to exit the pumping chamber through a fluid outlet to be delivered to the vehicle brake system.

Various objects and advantages of this invention will become apparent to those skilled in the art from the following detailed description of the preferred embodiment, when read in light of the accompanying drawings.

BRIEF DESCRIPTION OF THE DRAWINGS

FIG. 7 is a prospective view of a second embodiment of a piston in accordance with the present invention.

FIG. 8 is a top view of a portion of the piston shown in FIG. 7 and a second embodiment of a seal in accordance with the present invention.

DETAILED DESCRIPTION OF THE PREFERRED EMBODIMENTS

Figure 1:
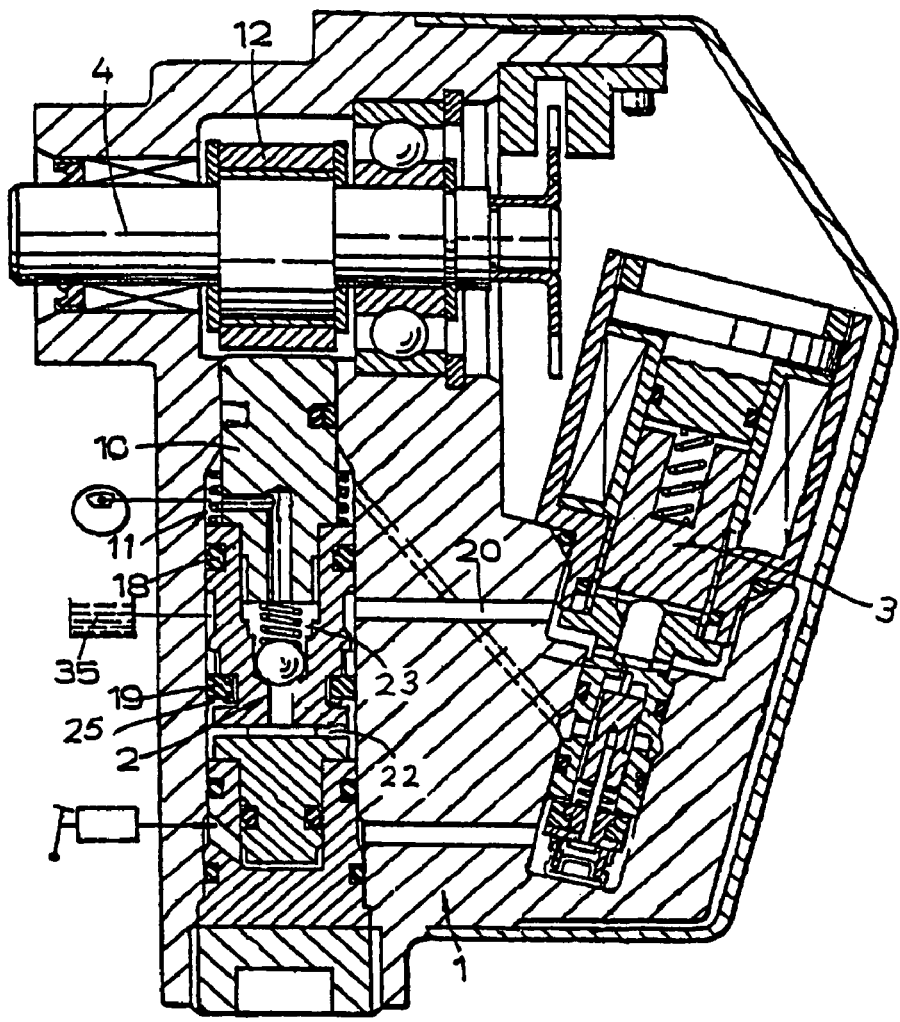
FIG. 1 is a cross sectional view of a known prior art hydraulic pump assembly.
Figure 2:
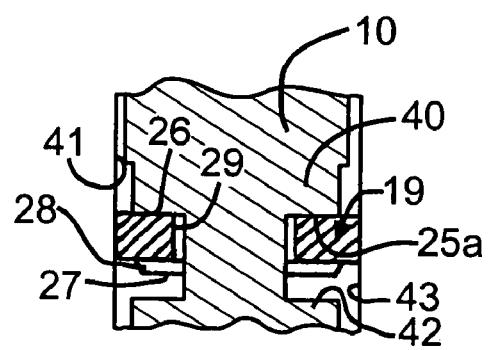
FIG. 2 is a cross sectional view of the seal of the known prior art hydraulic pump assembly illustrated in FIG. 1.
Figures 3, 4:
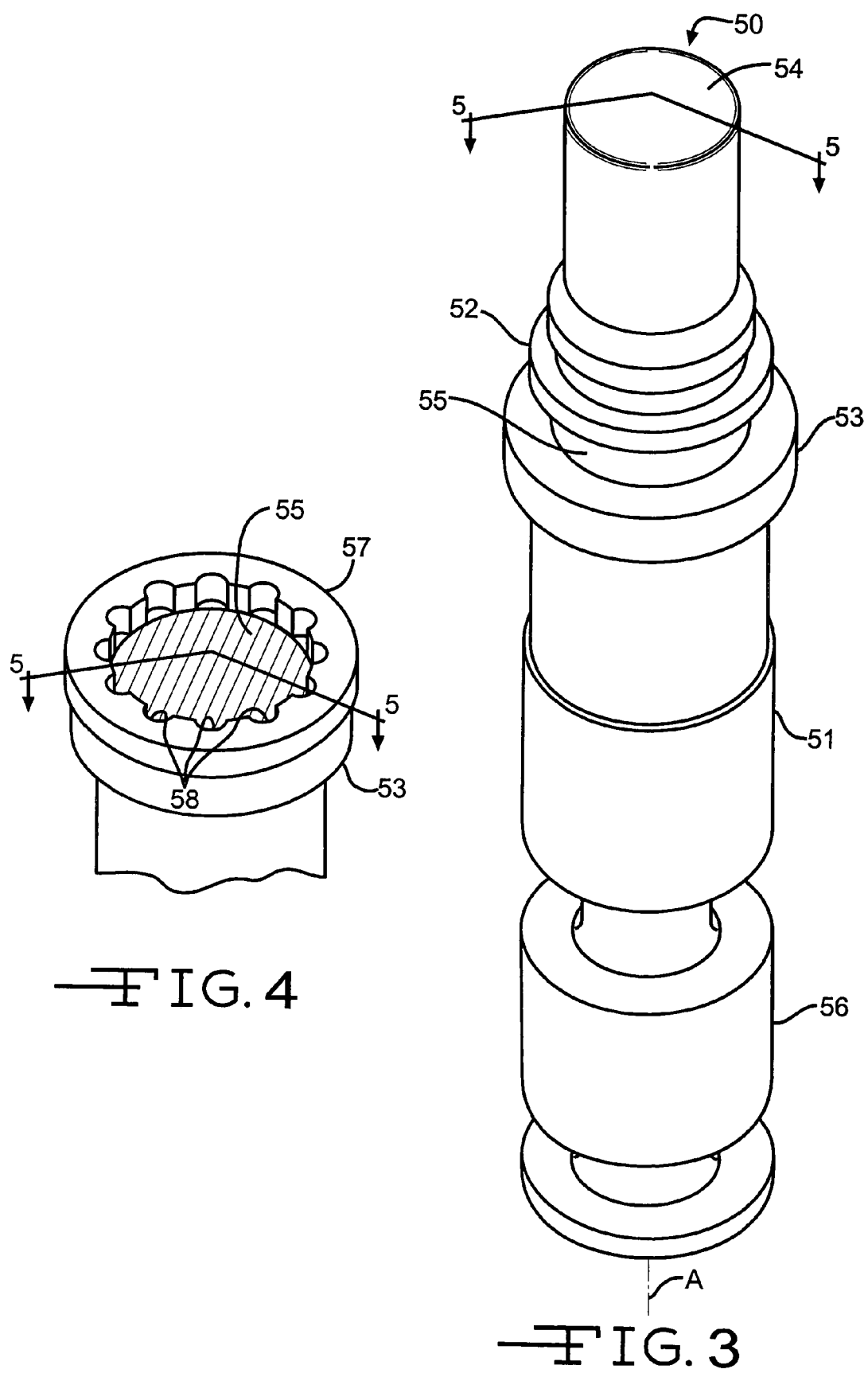
FIG. 3 is a prospective view of a first embodiment of a piston in accordance with the present invention.
FIG. 4 is a prospective view of a portion of the piston shown in FIG. 3 and a first embodiment of a seal in accordance with the present invention.

Referring again to the drawings, there is illustrated in FIG. 3, a first embodiment of a piston, indicated generally at 50, in accordance with this invention. The piston 50 comprises a shaft 51, a retaining flange 52, and an inlet flange 53. The retaining flange 52 extends substantially perpendicular from the shaft 51 near a first end portion 54 of the shaft 51. The inlet flange 53 extends substantially perpendicular from the shaft 51 below and spaced apart from the retaining flange 52. The retaining flange 52 and the inlet flange 53 cooperate to define an intermediate portion 55 of the shaft 51 disposed between retaining flange 52 and the inlet flange 53. The retaining flange 52 may have a generally circular cross section, and has a radius taken from the axis A that is larger than a radius $R_1$ taken from the axis A of the intermediate portion 55, the purpose of which will be described below. The inlet flange 53 may have a generally circular cross section, and has a radius taken from the axis A that is larger that the radius $R_1$ of the intermediate portion 55.

The shaft 51 is generally elongated along longitudinal axis A. The shaft 51 includes a second end portion 56, opposite the first end portion 54. The intermediate portion 55, described above is disposed between the first end portion 54 and the second end portion 56. The second end portion 56 is engaged by a driving mechanism (not shown) for reciprocatingly driving the piston 50. The intermediate portion 55 of the shaft 51 may have a generally circular cross section. The intermediate portion 55 extends outwardly from the axis A to a radius $R_1$, as is shown in FIGS. 5 and 6, and as will be described further below.

Referring now to FIG. 4, an annular high-pressure seal 57 is disposed around the intermediate portion 57 of the piston 50. In a preferred embodiment, the high-pressure seal 57 has a generally rectangular radial cross section as illustrated for each portion of the seal 57 shown on either side of the axis A in FIG. 4. However, it will be appreciated that the seal may have any radial cross-section. In a preferred embodiment, the seal 57 is not as thick as the intermediate portion 55 is long, such that the seal 57 can reciprocate between the retaining flange 52 and the inlet flange 53 of the piston 50, as will be described below. The seal 57 is preferably elastomeric. The seal 57 may preferably include a low friction plastic, such as nylon. In a preferred embodiment, the seal 57 includes a base material, such as Polytetrafluoroethylene (PTFE) sold under the tradename Teflon® and manufactured by DuPont, and a filler material, such as carbon. In a more preferred embodiment, the seal 57 includes carbon fiber, or other high tensile strength fibers suitable for use in composite materials.

The seal 57 has at least one passageway 58 formed therethrough. In a preferred embodiment, the at least one passageway 58 comprises a plurality of longitudinally extending grooves, preferably with semi-circular cross-section, that have been formed in or machined through the seal 57 around an inner periphery of the seal 57. In a more preferred embodiment, the at least one passageway 58 comprises a plurality of longitudinally extending notches molded in the seal 57, with preferably rectangular or diamond-shaped cross-section. However, it will be appreciated that the at least one passageway 58 may be formed in the seal 57 in any manner, and may have any suitable cross-section. The at least one passageway 58 is formed through the seal 57 such that the at least one passageway 58 does not extend outwardly into the seal 57 any further than a radius $R_2$ from the axis A as shown in FIG. 5.

Figure 5:
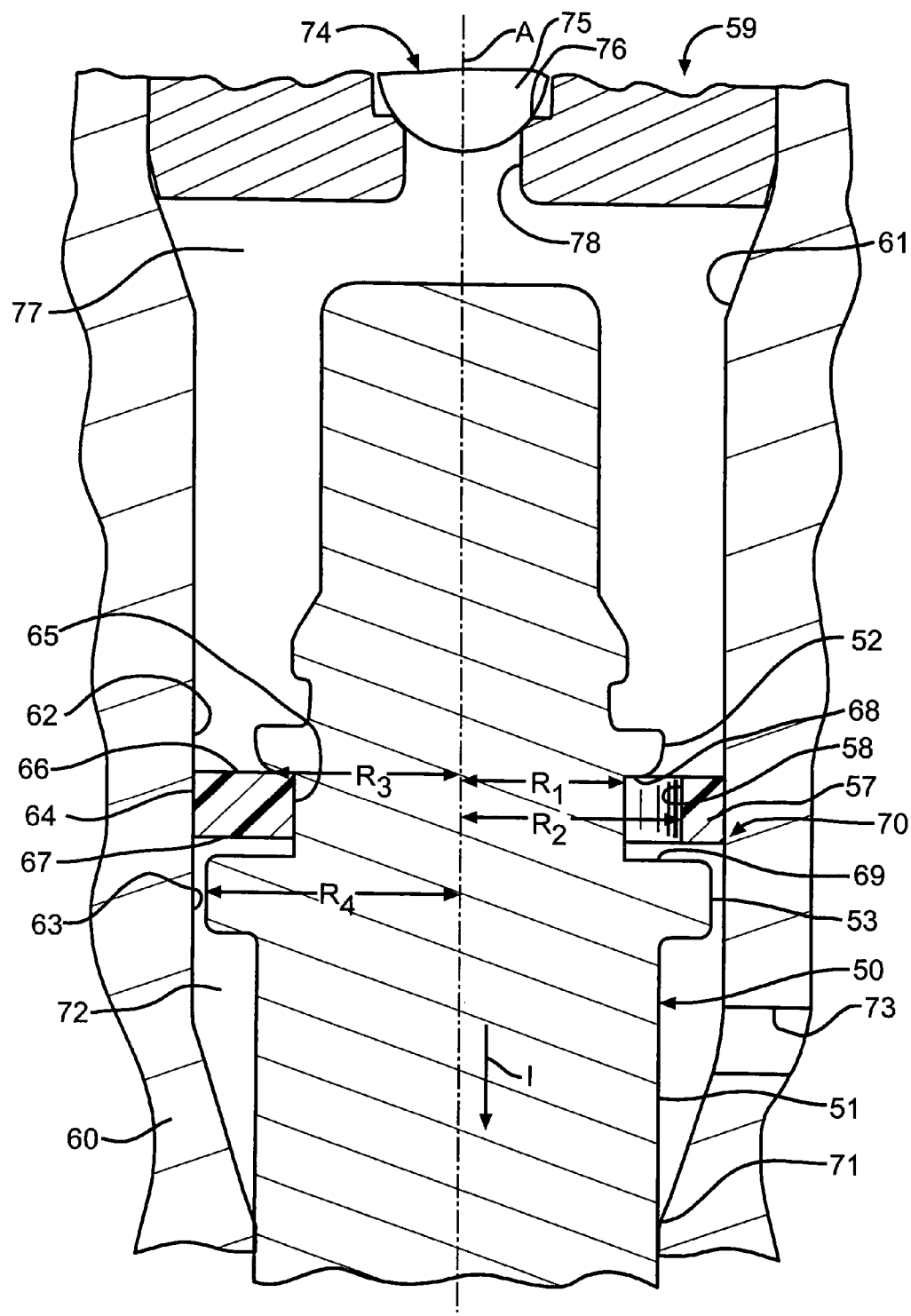
FIG. 5 is a cross sectional view of the piston and seal shown in FIGS. 3 and 4, taken along line 5—5, with the piston disposed within a first embodiment of a pump assembly, in accordance with the present invention.
Figure 6:
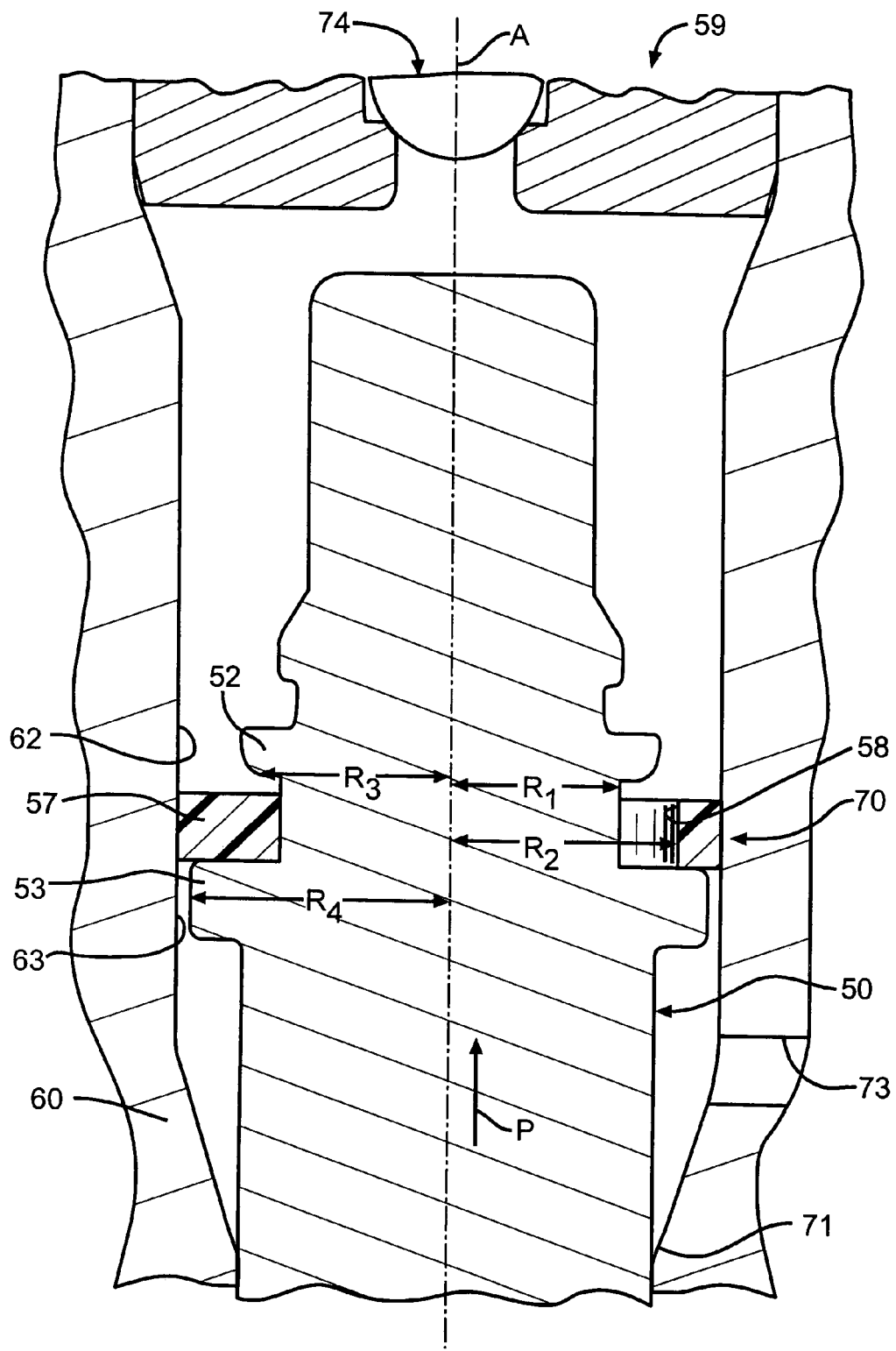
FIG. 6 is a cross sectional view of the pump assembly of FIG. 5.

The piston 50 is suitable for use in a pump assembly, such as the first embodiment of a pump assembly, indicated generally at 59, in FIGS. 5 and 6. The pump assembly 59 comprises a housing 60 having a bore 61 formed therethrough. The piston 50 is mounted for reciprocal movement within the bore 61 of the housing 60. In a preferred embodiment, the piston 50 is comprised of materials that are compatible with hydraulic brake fluid.

Preferably, the seal 57 is formed of a material that is sufficient to sustain operation of the pump assembly 59 under operating conditions within the pump assembly 59 as described herein, such as the relatively high operating pressures of a pump assembly within a vehicle brake system. In a preferred embodiment, the seal 57 is formed of a material that is sufficient to sustain operation of the pump assembly 59 with an operating pressure range of about 0 to about 250 bars absolute pressure within the pump assembly 59, as will be described in more detail below. However, it will be appreciated that operating pressure within the pump assembly 59 may vary, and may be a negative pressure under some operating conditions, as will be described below. In a preferred embodiment, the seal 57 is formed of a material that is sufficient to sustain operation of the pump assembly 59 in a temperature range of about −40 degrees Celsius to about 120 degrees Celsius. Additionally, in a preferred embodiment, the seal 57 is comprised of materials that are compatible with hydraulic brake fluid.

The retaining flange 52 and the housing 60 cooperate to form an outlet passageway 62 through the bore 61. As illustrated, the outlet passageway 62 is generally annular and extends about the periphery of the retaining flange 52, although such is not required. The outlet passageway 62 may have any desired shape and may be disposed about or through any portion of the retaining flange 52. The outlet passageway 62 has an inner radius $R_3$ taken from the axis A. The outlet passageway 62 is formed between retaining flange 52 and the housing 60 such that the outlet passageway 62 does not extend further into the retaining flange 52 any closer than the radius $R_3$ from the axis A, as seen in FIG. 4. In a preferred embodiment, the inner radius $R_3$ may be smaller than the outer radius $R_2$ of the seal 57 and may be larger than the outer radius $R_1$ of the intermediate portion 55.

The inlet flange 53 and the housing 60 cooperate to form an inlet passageway 63 through the bore 61. As illustrated, the inlet passageway 63 is generally annular and extends about the periphery of the inlet flange 53, although such is not required. The inlet passageway 63 may have any desired shape and may be disposed about or through any portion of the inlet flange 53. The inlet passageway 63 has an inner radius R4 taken from the axis A. The inlet passageway 63 is formed between inlet flange 53 and the housing 60 such that the inlet passageway 63 does not extend further into the inlet flange 53 any closer than the radius $R_4$ from the axis A, as seen in FIG. 4. In a preferred embodiment, the radius $R_4$ is greater than the radius $R_2$, the outer radius of the at least one passageway 58, such that even though the at least one passageway 58 and the passageway 63 may be aligned to overlap radially, the at least one passageway 58 and the passageway 63 are not directly communicably connected with one another.

The seal 57 has a first surface 64 that slidingly engages the walls of the housing 60 that form the bore 61 to form a dynamic seal therebetween. The seal 57 also has a second surface 65 that slidingly engages the outer periphery of the intermediate portion 55 of the piston 50, although such is not required. The seal 57 is able to move relative to the intermediate portion 55 between a first position, in which the seal 57 contacts the retaining flange 52 and a second position, in which the seal 57 contacts the inlet flange 53 as will be described below.

The seal 57 further includes a third surface 66 that engages a surface 68 of the retaining flange 52 when the seal 57 is in the first position thereof. As indicated above, in a preferred embodiment, the at least one passageway 58 is a plurality of similar passageways in the form of grooves that are symmetrically positioned around the seal 57, so that the seal 57 is evenly axially supported by the retaining flange 52 when seated in the first position.

The seal 57 has a fourth surface 67 that may engage a sealing surface 69 of the inlet flange 53 when the seal 57 is in a second position relative to the inlet flange 53, as will be described below. When the seal 57 is in the second position, the fourth surface 67 engages the sealing surface 69. The seal 57 prevents fluid flow through the at least one passageway 59 through the inlet flange 53, because, as is best shown in FIG. 5, the seal 57 seats against the sealing surface 69 blocking the passageway 63. Fluid is not able to flow out of the at least one passageway 58 past the seal 57, so fluid is not able to flow from the at least one passageway 58, around the seal 57, and into the passageway 63. Therefore, the seal 57, in the second position, prevents the at least one passageway 58 and the passageway 63 from fluid communication with one another.

Thus, the seal 57 and the inlet flange 53 cooperate to form a first check valve assembly 70, as will be described in more detail below. In a preferred embodiment, the at least one passageway 58 is a plurality of similar passageways that are symmetrically positioned throughout the seal 57, so that the seal 57 is evenly supported by the inlet flange 53 when seated in the second position.

The pump assembly 59 will now be further described. The second end portion 56 of the piston 50 is mounted so that the piston 50 may reciprocate within the bore 61 of the housing 60. The piston 50 slides against the walls of the bore 61 as the piston 50 reciprocates. A seal 71 may be provided or formed by the piston 50 and the walls of the bore 61. The seal 71, the seal 57, and the piston 50 define an inlet chamber 72 within the bore 61. A fluid inlet 73 is communicably connected to the inlet chamber 72 to supply fluid to the pump assembly 59, as will be described below. Alternatively, it will be appreciated that the seal 71 may not be provided, and the inlet chamber 72 may extend such that the fluid of the inlet chamber 72 may be used to lubricate the piston 50 and the walls of the bore 61 to facilitate the reciprocal movement therebetween. In a more preferred embodiment, an o-ring (not shown) may be disposed around the shaft 51 of the piston 50 near the second end portion 56 of the piston 50 instead of the seal 71 such that the inlet chamber 72 extends below the intersection of the walls of the bore 61 and the piston 50.

At the end of the bore 61 opposite the piston 50, a second check valve assembly 74 is provided. The second check valve assembly 74 includes a ball 75 and a seat 76. Preferably, the second check valve assembly 74 is formed of a material that is sufficient to sustain operation of the pump assembly 59 under operating conditions within the pump assembly 59 as described herein, such as the relatively high operating pressures of a pump assembly within a vehicle brake system. Additionally, in a preferred embodiment, second check valve assembly 74 is comprised of materials that are compatible with hydraulic brake fluid. A pumping chamber 77 is defined within the bore 61 between the second check valve assembly 74 and the combination of the piston 50 and the seal 57. As is evident from the structure of the pump 59 and as will be evident from the operation of the pump 59 described below, the pump 59 is highly efficient due to the relatively small unswept volume of the piston 50.

The operation of the pump assembly 59 will now be described. At the end of a pumping stroke, when the piston 50 is closest to the second check valve assembly 74, the seal 57 is in the second position, thereby seated against the sealing surface 69 of the inlet flange 53 (the first check valve assembly 70 is shut). During a fluid inlet stroke, the piston 50 moves in a direction I away from the second check valve assembly 74. The seal 57 is disposed between the retaining flange 52 and the inlet flange 53, and, as the piston 50 moves away from the second check valve assembly 74, pressure in the pumping chamber 77 drops below the pressure in the inlet chamber 72 as the pumping chamber 77 expands. The differential pressure unseats the seal 57 from the inlet flange 53, opening the first check valve assembly 70 and allowing fluid to flow from the inlet chamber 72 through the passageways 63, 58, and 62, into the pumping chamber 77. The seal 57 will generally have greater friction to the wall of the bore 61 than to the piston 50, and will tend to remain stationary as the piston 50 moves. However, as the piston 50 continues to move away from the second check valve assembly 74, the retaining flange 52 will eventually intercept the seal 57, and the seal 57 will be urged away from the second check valve assembly 74 by the retaining flange 52 of the piston 50, so that the seal 57 is now in the first position thereof. Once the seal 57 has been intercepted by the retaining flange 52, the seal 57 will remain seated against the retaining flange 52 as long as the piston 50 continues to move in the same direction, e.g., away from the second check valve assembly 74.

During a pumping stroke, the piston 50 moves in a direction P, back toward the second check valve assembly 74. As the piston 50 moves, the seal 57 again tends to remain stationary due to friction with the wall of the bore. Additionally, as the pumping chamber gets smaller as the piston 50 moves toward the second check valve assembly 74, pressure starts to rise, even with the first check valve assembly 70 still open, due to head losses in the passageways. Thus, the seal 57 moves out of the second position thereof. As the piston 50 continues to move toward the second check valve assembly 74, the inlet flange 53 will eventually intercept the seal 57, and the seal 57 will be urged toward the second check valve assembly 74 by the inlet flange 53 of the piston 50. Once the seal 57 has been intercepted by the inlet flange 53, the seal 57 will remain in the second position thereof, i.e. seated against the inlet flange 53, as long as the piston 50 continues to move in the same direction, e.g., toward the second check valve assembly 74. When the seal 57 is in the second position thereof, the first check valve assembly 70 is in the closed position, as illustrated in FIG. 6. With the seal 57 seated against the sealing surface 69 of the inlet flange 53, fluid cannot flow into the at least one passageway 58 from the inlet passageway 63. Therefore, the pumping chamber 77 is isolated from the inlet chamber 72. Thus, as the piston 50 moves further into the bore 61, the volume of the pumping chamber 77 decreases, and pressure is raised in the fluid within the pumping chamber 77.

As the piston 50 continues to move toward the second check valve assembly 74, the fluid pressure within the chamber 77 continues to build until the fluid pressure within the chamber 77 is greater than the resistance required to unseat the ball 75 from the seat 76 of the second check valve assembly 74. When the ball 75 is unseated, the second check valve assembly 74 opens and pressurized fluid is discharged from the pump 59 via an outlet 78.

As the piston 50 continues to move toward the second check valve assembly 74, the volume of the inlet chamber 72 increases. The increase in volume of the inlet chamber 72 may create negative pressure or a vacuum pressure within the inlet chamber 72. This vacuum pressure within the inlet chamber 72 pulls fluid from the fluid inlet 73 into the inlet chamber 72. Thus, the pump assembly 59 may be a self-priming or pre-charging pump, and the pump assembly 59 may operate with negative pressure conditions within the inlet chamber 72. At the end of a pumping stroke, the first end portion 54 of the piston 50 is relatively close to the second check valve assembly 74. With the piston 50 in this position, the first check valve assembly 70 and the second check valve assembly 74 are in relatively close proximity to one another, such that the pumping chamber 77 is relatively small, as compared to the pumping chambers of conventional pumps. The axial distance between the first check valve assembly 70 and the second check valve assembly 74 is minimized so that the pump assembly 59 has a relatively small unswept volume.

It will be appreciated that the size and design of the seal 57, the at least one passageway 58, the passageway 62, and the passageway 63, must be coordinated so that the seal 57 and piston 50 cooperate such that the pump 59 operates as described above. Conversely, it will be appreciated that the seal 57, the at least one passageway 58, the passageway 62, and the passageway 63 could be any size or shape capable of performing as described above.

Referring now to FIG. 7, there is illustrated a portion of a second embodiment of a pump assembly, indicated generally at 159, in accordance with this invention. The pump assembly 159 is similar to the pump assembly 59, and only those elements that differ will be described herein, and corresponding elements have been given the same reference numeral incremented by 100.

In the above-described embodiment, the retaining flange 52 is integral to the piston 50. The retaining flange 52 and the piston 50 may be formed as an integral unit, or the retaining flange 52 may be formed separately and permanently fixed to the piston 50 by any suitable means, such as welding or permanent adhesive, etc. However, it is also contemplated that the retaining flange may be formed separately and non-permanently affixed to the piston 50. The retaining flange may be pressed on, affixed with a snap fit, affixed with threading or any other non-permanent method. Such an arrangement may be advantageous in facilitating the positioning of an original or replacement seal onto the piston. In the example illustrated in FIG. 7, the piston 150 includes a cir-clip 152 disposed around the piston 150 to form a retaining flange, similar in function to the retaining flange 52. The piston 150 further includes an inlet flange 153 and an intermediate portion 155 disposed between the cir-clip 152 and the inlet flange 153. Unlike the retaining flange 52 of the piston 50, the cir-clip 152 of the piston 150 does not have an annular passageway, like passageway 62, formed about the outer annular periphery of the cir-clip 152. Instead, the cir-clip 152 is preferably semi-circular in cross-section, and may have a passageway 162 formed about the portion of the piston 150 in which the cir-clip 152 does not extend. In a preferred embodiment, the cir-clip 152 does not extend about a portion of the piston 150 that is about 110° of the circumference of the piston 150. Additionally, the passageway 162 formed by the piston 150, the cir-clip 152, and the housing 160 may extend between a portion of the cir-clip 152 and the piston 150 and/or between a portion of the cir-clip 152 and the housing 160, as shown in FIG. 8. The seal 157 may reciprocate between the cir-clip 152 and the inlet flange 153, in a manner similar to that described above for the seal 57.

Figure 9:
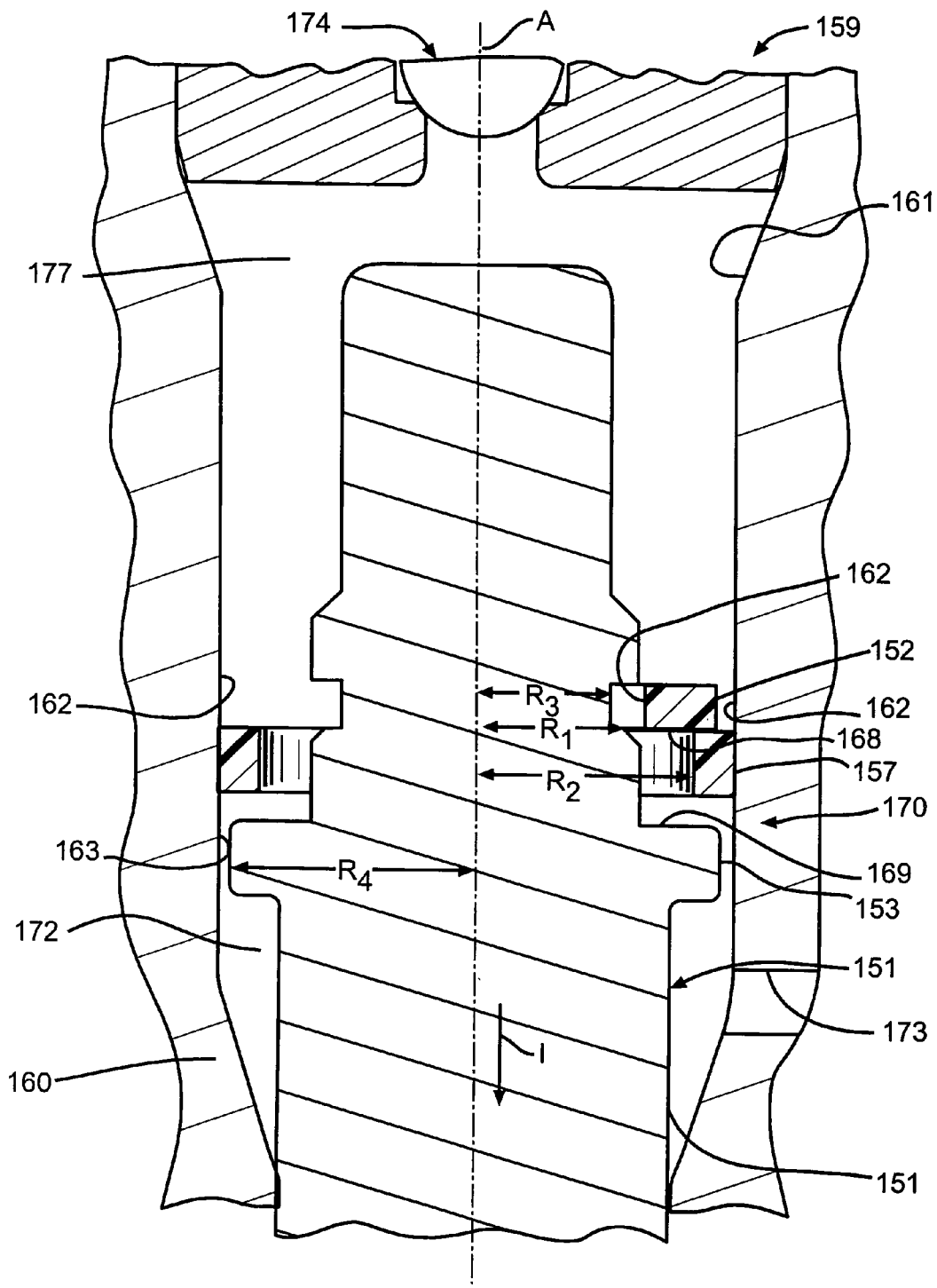
FIG. 9 is a cross sectional view of the piston and seal shown in FIGS. 7 and 8, taken along line 9—9, with the piston disposed within a second embodiment of a pump assembly, in accordance with the present invention.
Figure 10:
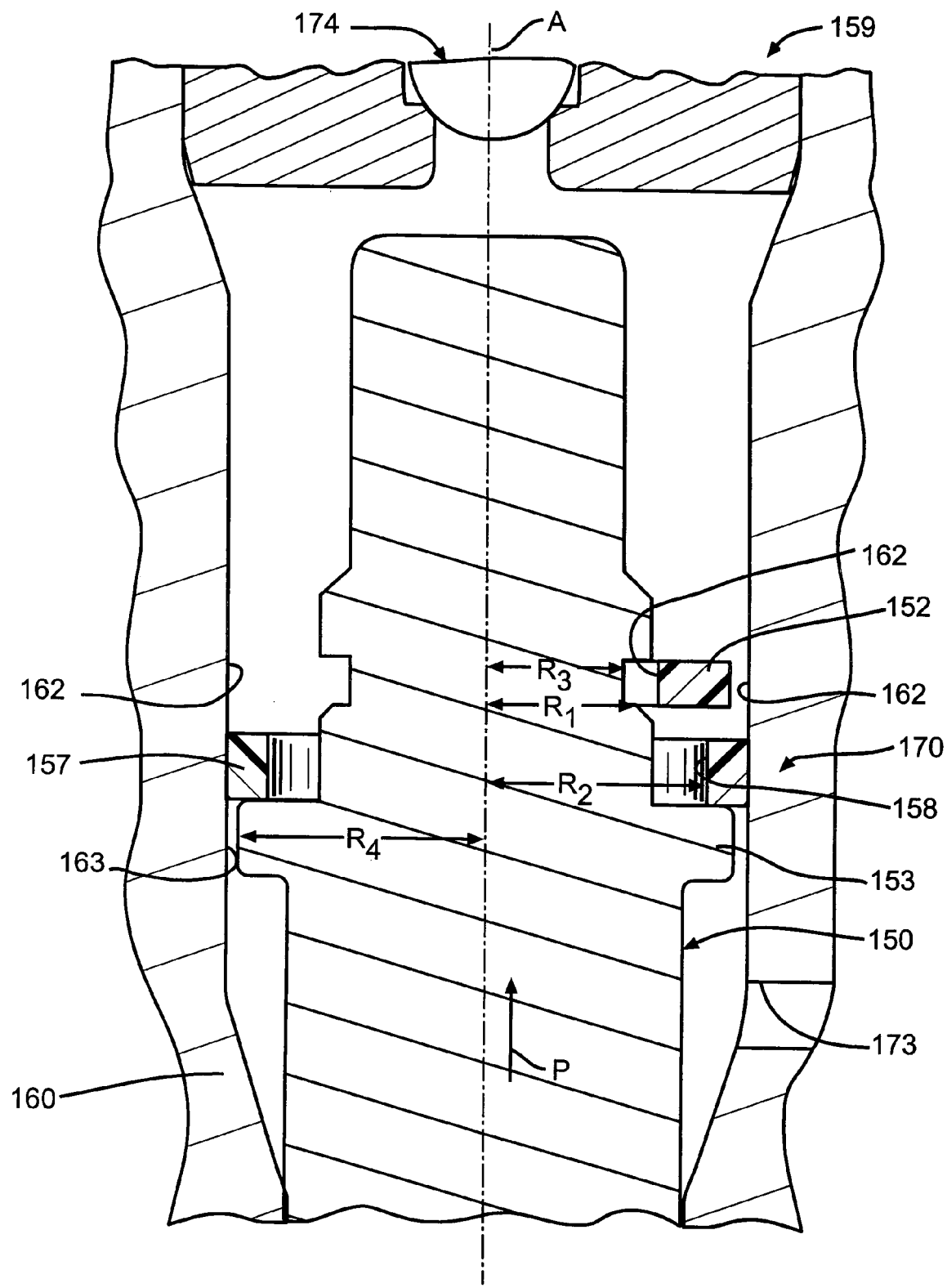
FIG. 10 is a cross sectional view of the pump assembly of FIG. 9.

Preferably, the seal 157 differs from the seal 57 in that the seal 157 does not have a passageway formed therethrough. Instead, the seal 157, the piston 150, and the housing 160 cooperate the form at least one passageway 158 between the seal 157 and the piston 150 about an inner periphery of the seal 157. Preferably, the at least one passageway 158 formed between the seal 157 and the piston 150 is generally annular, although such is not required. It will be appreciated that the seal 157 may include various passageways formed therein, such as the at least one passageway 58 described in the prior embodiment. The at least one passageway 158 has an outer radius $R_2$ from the axis A. The outer radius $R_2$ is smaller than an inner radius $R_4$ of a passageway 163 formed by the inlet flange 153 and the housing 160. The at least one passageway 158 has an inner radius $R_1$ from the axis A. The inner radius $R_1$ is larger than the inner radius $R_3$ of a passageway 162 formed by the retaining flange 152 and the housing 160. The inner radius R1 may also be larger than an outer radius of the passageway 162, although such is not required. If the inner radius R1 is larger than an outer radius of the passageway 162, as shown in FIGS. 9 and 10, the piston 150 may be shaped such that the at least one passageway 158 and the passageway 162 are communicable connected. It will be appreciated that the piston 150, the at least one passageway 158, the passageway 162, and the housing 160 may be shaped in any manner relative to one another, such that the piston 150, the at least one passageway 158, the passageway 162, and the housing 160 cooperate so that the at least one passageway 158 and the passageway 162 are communicable connected.

The seal 157 and the inlet flange 153 form a check valve assembly 170. However, the structure of the check valve assembly 170 varies from structure of the check valve assembly 70. The at least one passageway 158 is communicably connected to the passageway 162 formed by the cir-clip 152, the piston 150, and the housing 160. In a preferred embodiment, the at least one passageway 158 is shaped such that no matter how the seal 157 is rotated relative to the cir-clip 152, the at least one passageway 158 is communicably connected to the passageway 162.

When the seal 157 is in a first position relative to the inlet flange 153, the seal 157 is unseated from the sealing surface 169 of the inlet flange 153, and may be seated against the surface 168 of the cir-clip 152, as described in the previous embodiment and as shown in FIG. 9. When the seal 157 is in the first position, fluid from the fluid inlet 173 is allowed to flow from the inlet chamber 172 through the passageway 163, below the seal 157, through the at least one passageway 158, through the passageway 163, and into a pumping chamber 177. Thus, the check valve assembly 170 is in a flow-through position. When the seal 157 is in a second position, seated against the sealing surface 169 of the inlet flange 153, as shown in FIG. 10, the at least one passageway 158 is prevented from communicating with the passageway 163. Thus, the check valve assembly 170 is in a closed position, such that the pump 159 works in a manner similar to that described for the pump 59.

The pistons 50, 150, seals 57, 157 and pump assemblies, 59, 159 have been described for use in a vehicle braking system, including, but not limited to, vehicle braking systems having anti-lock braking systems, and/or integrated or stand alone traction control and vehicle stability control systems. However, it will be appreciated that the pistons 50, 150, the seals 57, 157 and pump assemblies 59, 159 may be used in any vehicle component or in any other device requiring a piston, seal, or pump assembly. It will further be appreciated that the components of the various embodiments described herein may be used in any combination in accordance with the present invention.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A pump apparatus comprising:
   a housing having a bore formed therethrough;
   a piston disposed within said bore for reciprocal movement along a longitudinal axis therein, said piston having an inlet flange extending outwardly substantially perpendicular to said longitudinal axis, said piston having a retaining flange; and
   an annular seal having a plurality of longitudinally extending passageways formed therein and disposed around said piston for reciprocal movement thereon, said inlet flange and said annular seal cooperating to form a check valve assembly, said check valve assembly dividing said bore into an inlet chamber and a pumping chamber, said retaining flange and said housing cooperating to form an outlet passageway of said check valve assembly, said annular seal being moveable to a first position relative to said inlet flange in which said plurality of longitudinally extending passageways communicate directly with said outlet passageway to said pumping chamber and said check valve assembly is in a flow-through position to fill said pump chamber with fluid from said inlet chamber during a fluid inlet stroke, said annular seal being moveable to a second position relative to said inlet flange in which said check valve assembly is closed.

2. The pump apparatus of claim 1, wherein said piston comprises an inlet flange extending outwardly substantially perpendicular to said longitudinal axis, said inlet flange and said housing cooperating to form an inlet passageway to said check valve assembly.

3. The pump apparatus of claim 2, wherein said inlet passageway in said bore has an inner radius R4 defined from said longitudinal axis that is larger than an outer radius R2 of said plurality of longitudinally extending passageways defined from said longitudinal axis when said annular seal is centered about said longitudinal axis, such that when said annular seal abuts said inlet flange, said plurality of longitudinally extending passageways and said inlet passageway do not overlap one another and there is no fluid communication therebetween.

4. The pump apparatus of claim 1, wherein said piston comprises a retaining flange, and wherein said retaining flange and said housing cooperate to form an outlet passageway of said check valve assembly that extends annularly about said retaining flange.

5. The pump apparatus of claim 4, wherein said outlet passageway has an inner radius R3 defined from said longitudinal axis that is smaller than an outer radius R2 of said plurality of longitudinally extending passageways in said annular seal defined from said longitudinal axis when said seal is centered about said longitudinal axis, such that said plurality of longitudinally extending passageways and said outlet passageway are in fluid communication.

6. The pump apparatus of claim 4, wherein said piston comprises an inlet flange extending outwardly substantially perpendicular to said longitudinal axis, and said inlet flange and said housing cooperating to form an inlet passageway within said bore, and wherein said outlet passageway and said inlet passageway are communicably connected when said check valve assembly is in said flow-through position.

7. The pump apparatus of claim 6, wherein said outlet passageway, said inlet passageway, and said plurality of longitudinally extending passageways are communicably connected when said check valve assembly is in said flow-through position.

8. A pump apparatus comprising:
a housing having a bore formed therethrough;
a piston disposed within said bore for reciprocal movement therein; said piston comprising:
an inlet flange, said inlet flange extending generally radially outwardly from said piston, said inlet flange and said housing cooperating to define at least one inlet passageway;
a retaining flange, said retaining flange extending generally radially outwardly from said piston, said retaining flange and said housing cooperating to define at least one outlet passageway; and
an intermediate portion between said inlet flange and said retaining flange; and
an annular seal disposed around said intermediate portion of said piston, said seal slidingly engaging a wall of said bore and an outer surface of said intermediate portion, said seal having at least one longitudinally extending passageway formed therein in continuous fluid communication with said outlet passageway, said housing, said seal, and said piston cooperating to form a check valve assembly, said bore being divided into an inlet chamber and a pumping chamber by said check valve assembly, said seal being moveable to a first position spaced apart from said inlet flange such that said at least one longitudinally extending passageway communicates directly with said pumping chamber and such that said check valve assembly is in a flow-through position to allow fluid to fill said pumping chamber through said at least one inlet passageway, said seal being moveable to a second position sealing against said inlet flange such that said check valve assembly is in a closed position to prevent fluid flow through said at least one outlet passageway and to allow fluid within said pumping chamber to be pressurized during movement of said piston in a pumping stroke.

9. The pump apparatus of claim 8, wherein said at least one longitudinally extending passageway is comprised of at least one groove with semi-circular cross-section formed through said seal.

10. A pump apparatus comprising:
a housing having a bore formed therethrough;
a piston disposed within said bore for reciprocal movement along a longitudinal axis therein, said piston having an inlet flange extending outwardly substantially perpendicular to said longitudinal axis, said piston having a retaining flange; and
an annular seal having at least one longitudinally extending groove with semi-circular cross-section defined therein, said annular seal disposed around said piston for reciprocal movement thereon, said inlet flange and said annular seal cooperating to form a check valve assembly, said check valve assembly dividing said bore into an inlet chamber and a pumping chamber, said retaining flange and said housing cooperating to form an outlet passageway of said check valve assembly, said annular seal being moveable to a first position relative to said inlet flange in which said at least one longitudinally extending groove communicates directly with said outlet passageway to said pumping chamber and said check valve assembly is in a flow-through position to fill said pump chamber with fluid from said inlet chamber during a fluid inlet stroke, said annular seal being moveable to a second position relative to said inlet flange in which said check valve assembly is closed.

11. The pump apparatus of claim 10, wherein said piston comprises an inlet flange extending outwardly substantially perpendicular to said longitudinal axis, said inlet flange and said housing cooperating to form an inlet passageway to said check valve assembly.

12. The pump apparatus of claim 11, wherein said inlet passageway in said bore has an inner radius R4 defined from said longitudinal axis that is larger than an outer radius R2 of said at least one longitudinally extending groove defined from said longitudinal axis when said annular seal is centered about said longitudinal axis, such that when said annular seal abuts said inlet flange, said at least one longitudinally extending groove and said inlet passageway do not overlap one another and there is no fluid communication therebetween.

13. The pump apparatus of claim 10, wherein said piston comprises a retaining flange, and wherein said retaining flange and said housing cooperate to form an outlet passageway of said check valve assembly that extends annularly about said retaining flange.

14. The pump apparatus of claim 13, wherein said outlet passageway has an inner radius R3 defined from said longitudinal axis that is smaller than an outer radius R2 of said at least one longitudinally extending groove in said annular seal defined from said longitudinal axis when said seal is centered about said longitudinal axis, such that said at least one longitudinally extending groove and said outlet passageway are in fluid communication.

15. The pump apparatus of claim 13, wherein said piston comprises an inlet flange extending outwardly substantially perpendicular to said longitudinal axis, and said inlet flange and said housing cooperating to form an inlet passageway within said bore, and wherein said outlet passageway and said inlet passageway are communicably connected when said check valve assembly is in said flow-through position.

16. The pump apparatus of claim 15, wherein said outlet passageway, said inlet passageway, and said at least one longitudinally extending groove are communicably connected when said check valve assembly is in said flow-through position.

* * * * *